(12) United States Patent
Tigges

(10) Patent No.: US 9,352,622 B2
(45) Date of Patent: May 31, 2016

(54) ROTARY TRANSMISSION LEADTHROUGH AS PART OF A TIRE PRESSURE REGULATING SYSTEM OF A VEHICLE

(71) Applicant: PTG Reifendruckregelsysteme GmbH, Neuss (DE)

(72) Inventor: Martin Tigges, Neuss (DE)

(73) Assignee: PTG Reifendruckregelsysteme GmbH, Neuss (DE)

( * ) Notice: Subject to any disclaimer, the term of this patent is extended or adjusted under 35 U.S.C. 154(b) by 875 days.

(21) Appl. No.: 13/658,548

(22) Filed: Oct. 23, 2012

(65) Prior Publication Data

US 2013/0112327 A1    May 9, 2013

(30) Foreign Application Priority Data

Oct. 24, 2011  (DE) ............... 20 2011 051 737 U

(51) Int. Cl.
*B60C 29/00*  (2006.01)
*B60C 23/00*  (2006.01)

(52) U.S. Cl.
CPC ............ *B60C 29/00* (2013.01); *B60C 23/003* (2013.01)

(58) Field of Classification Search
CPC ...... B60C 29/00; B60C 23/003; B60C 23/02; B60C 23/00
USPC ......................... 152/415, 416, 417
See application file for complete search history.

(56) References Cited

U.S. PATENT DOCUMENTS

| | | | |
|---|---|---|---|
| 705,777 A * | 7/1902 | McAuliffe | E03C 1/294 137/247.45 |
| 1,800,780 A * | 4/1931 | Daneel | B60C 23/003 152/417 |
| 2,418,730 A | 1/1944 | Schule | |
| 6,363,985 B1 | 4/2002 | Beesley | |
| 6,439,044 B1 | 8/2002 | Tigges | |

(Continued)

FOREIGN PATENT DOCUMENTS

| | | |
|---|---|---|
| DE | 202010008453 | 11/2010 |
| EP | 1095799 | 5/2001 |

(Continued)

OTHER PUBLICATIONS

Extended European search report for European patent application 12188673.3 mailed Jan. 17, 2013.

*Primary Examiner* — S. Joesph Morano
*Assistant Examiner* — Jean Charleston
(74) *Attorney, Agent, or Firm* — Polson Intellectual Property Law, PC; Margaret Polson

(57) ABSTRACT

A rotary transmission leadthrough as part of a vehicle tire pressure regulating system, comprising a rotor structural group that can be connected in a torque-connected manner to a shaft of the vehicle which supports a wheel, and a stator structural group stationarily mounted opposite the rotary movement of the rotor structural group. A sealable conduit between the rotor structural group and the stator structural group is a path for transferring gas from the stator structural group to the rotor structural group and/or the inverse to regulate tire pressure. The rotor structural group is multipartite. A first rotor part is a closed annular body that can be pushed on the vehicle shaft. A second rotor part mounted axially to the first rotor part and connected to it in a torque-connected manner is designed as a tensioning ring for connecting the rotor structural group to the vehicle shaft in a torque-connected manner.

9 Claims, 2 Drawing Sheets

(56) References Cited

U.S. PATENT DOCUMENTS

| | | | |
|---|---|---|---|
| 6,510,882 B1 * | 1/2003 | Arvidsson | B60C 23/003 152/417 |
| 6,550,511 B2 * | 4/2003 | Nienhaus | B60C 23/003 152/415 |
| 7,287,565 B2 | 10/2007 | Hottebart et al. | |
| 7,931,061 B2 * | 4/2011 | Gonska | B60C 23/003 152/417 |
| 2004/0113424 A1 * | 6/2004 | Tries | F16L 39/04 285/121.3 |
| 2005/0045259 A1 | 3/2005 | Hottebart et al. | |
| 2009/0211682 A1 | 8/2009 | Sobotzik | |

FOREIGN PATENT DOCUMENTS

| | | |
|---|---|---|
| GB | 191126885 | 5/1912 |
| WO | 0015451 | 3/2000 |

* cited by examiner

ROTARY TRANSMISSION LEADTHROUGH AS PART OF A TIRE PRESSURE REGULATING SYSTEM OF A VEHICLE

BACKGROUND

Tire pressure regulating systems are used in motor vehicles, for example, in utility vehicles such as trucks, tractors or earth-moving machines in order to be able to adapt the tire pressure present in the tire to different operating situations of the motor vehicle. An adaptation of tire pressure takes place primarily as a function of the ground to be traveled on and/or of the load. The contact surface of the tire can be changed by the tire pressure. A tire has a greater contact surface with a lower tire pressure than with a higher tire pressure. For this reason it is preferable to drive with a lower tire pressure, and therefore a higher contact surface, on soft ground than on a firm roadway. The tire pressure can also be changed as a function of the particular load of the motor vehicle.

Such tire pressure regulating systems comprise a rotary transmission leadthrough in order to transmit compressed air from a compressed-air source on the vehicle to the rotatably supported wheel in order to increase the internal tire pressure. Such a rotary transmission leadthrough comprises a stator structural group located on the vehicle and a rotor structural group located on the wheel. The rotor structural group is separated from the stator structural group by a movement slot. Both structural groups are mounted either axially or radially to one another according to the design of the rotary transmission leadthrough. In order to transmit compressed air, stator and rotor have annular open grooves or chambers that are opposite one another. These annular open grooves or chambers face each other and are sealed by activatable seals such as those described in EP 1 095 799 B1. The seals form a chamber for the transmission of compressed air. An air line is provided on the wheel side on the rotor of the rotary transmission leadthrough which leads to the wheel rim. This air line extends through the rim in an opening and empties into the inside of the tire. A controllable valve is typically connected into the wheel-side air line and is open for the procedure of regulating the tire pressure and is closed after the conclusion of the procedure. The compressed air itself is made available by a compressor located on the vehicle. In the case of utility vehicles, the compressor for operating the brake system typically serves as compressor.

In a retrofitting of a vehicle, for example, a motor vehicle with such a tire pressure regulating system, the rotary transmission leadthroughs are welded with their rotary structural group on the rotating shaft carrying the wheel whose tire pressure is to be regulated. For the purposes of the tire pressure regulating system this type of connection of the rotary transmission leadthrough on the shaft is not a problem. In a few cases such a subsequent fastening on the shaft is problematic because the welding process and the associated effects of heat cause structural changes in the area of the welding site inside the shaft, typically the drive shaft. No adverse functional influences on such a drive shaft have been traced back to the welding of a rotary transmission leadthrough as part of a tire pressure regulating system onto the drive shaft. However, it is desirable to find a method for fastening a rotary transmission leadthrough to the vehicle shaft that does not have such disadvantages.

In the previously known rotary transmission leadthroughs the wheel-side supply line is connected to a connecting angle piece, which is a part of the rotor. This angle piece is screwed into the rotor in an axial direction. The outflow leading to the wheel is in a radial arrangement. In the case of an improper manipulation of wheels to be fastened on the shaft, especially when these wheels are set via a cone on the shaft, this can result in damage to the angle piece or even in its being torn off. In addition, it is desirable to keep the necessary installation space as small as possible in the axial direction relative to the vehicle shaft, particularly for motor vehicles that carry several wheels on one shaft.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The present disclosure relates to a rotary transmission leadthrough as part of a tire pressure regulating system for a vehicle. The tire pressure regulating system comprises a rotor structural group that can be connected in a torque-connected manner to a shaft of the vehicle which supports a wheel. The tire pressure regulating system also comprises a stator structural group stationarily mounted opposite the rotary movement of the rotor structural group. A sealed or sealable annular transmission conduit is present between the rotor structural group and the stator structural group. The conduit is a path for transferring a gas from the stator structural group to the rotor structural group and/or from the rotor structural group to the stator structural group for the purpose of regulating the tire pressure.

The rotary transmission leadthrough of the present disclosure is focused on the problem of further developing a rotary transmission leadthrough in such a manner that it can be connected with its rotor structural group to the rotating shaft of a vehicle without changing or otherwise adversely affecting the quality and functionality of the shaft. In addition, it is desirable to produce rotary transmission leadthrough that is less susceptible to being damaged on its wheel-side line connection and that uses less structural space in the axial direction.

This problem is solved in accordance with the present disclosure by constructing a multipartite rotor structural group for a generic rotary transmission leadthrough. A first rotor part is designed as a closed annular body that can be pushed on the shaft of the vehicle. A second rotor part is mounted axially to the first rotor part and connected to it in a torque-connected manner. The second rotor part is designed as a tensioning ring for connecting the rotor structural group to the vehicle shaft in a torque-connected manner.

In this rotary transmission leadthrough the rotor structural group is multipartite, that is, constructed at least in two parts. A first rotor part is a closed annular body. This body can be pushed onto the vehicle shaft. The size of this annular body is kept as small as possible relative to the vehicle shaft. The rotor structural group comprises a second rotor part in addition to the first rotor part. The second rotor part acts as a tensioning ring and serves to connect this second rotor part to the vehicle shaft in a torque-connected manner. This clamps the second rotor part firmly on the vehicle shaft. In addition, the second rotor part is connected to the first rotor part in a torque-connected manner, for example, by several bolts or screws arranged with their shaft parallel to the axis of rotation. To this extent the second rotor part serves as a connection piece for the connection of the first rotor part to the shaft in a torque-connected manner. The two rotor parts are mounted in an axial arrangement to one another, therefore, in an adjacent arrangement. The rotor structural group of the present disclosure does not need to be welded to the shaft in order to connect it in a torque-connected manner to the vehicle shaft. Moreover, the second rotor part, that is constructed as a tensioning ring and thus extends around the vehicle shaft and surrounds it as a result, can be used as a connection point extending in a radial direction for a line running to a wheel supported by the shaft. Since the second rotor part completely or at least substantially completely surrounds the shaft this radial line outflow is effectively prevented from damage in the event of an improper wheel mounting.

According to a preferred exemplary embodiment, the first rotor part comprises an internal conduit whose first end empties into the transmission conduit located between the rotor structural group and the stator structural group. As a result of the axial arrangement of the first rotor part and the second rotor part, the conduit in the first rotor part comprises a section running in the axial direction and that empties into a corresponding conduit of the second rotor part. In the previously described exemplary embodiment, in which the line outflow of the second rotor part is constructed in a radial arrangement, the bore inside the second rotor part is designed as an angled bore. The air transition site between the conduit of the first rotor part and that of the second rotor part is typically sealed with an O ring. This connection can be used to hold an O ring in its sealed position between the two conduits of the rotor parts due to the torque-connected manner of the second rotor part to the first rotor part. Because the conduits merge into one another, no additional tensioning elements or other connecting elements are required for establishing the sealed connection of the conduits of the two rotor parts.

An exemplary embodiment connects the second rotor part to the first rotor part by connection screws. In this embodiment, the threaded shaft of the connection screws engage with threaded sleeves of the first rotor part and are supported on the second rotor part by their heads. The connection screws extend through a perforation of the second rotor part. This perforation is typically constructed as a bore. It is advantageous to make the diameter of the bore greater than the diameter of the connection screws, namely, by the required tensioning play. The tensioning play is the play that the second rotor part, designed as a tensioning ring, can have its diameter reduced to in order to connect or clamp the second rotor part in a torque-connected manner to the vehicle shaft. To mount the rotary transmission leadthrough on the vehicle shaft, on the first rotor part is pushed on the shaft, then the second rotor part is connected in a torque-connected manner to the tensioning shaft, which causes the tensioning ring to reduce its diameter. The previously mounted connection screws are then tightened. The rotor structural group can be centered relative to the vehicle shaft at the same time.

According to a preferred exemplary embodiment, the first rotor part and the stator structural group are in a radial arrangement relative to one another as described in German utility model 20 2010 008 453 U1 by the same applicant. By this explicit reference to DE 20 2010 008 453 U1 its disclosed content regarding the formation of the rotary transmission leadthrough is also made subject matter of the present disclosure.

In addition to the exemplary aspects and embodiments described above, further aspects and embodiments will become apparent by reference to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
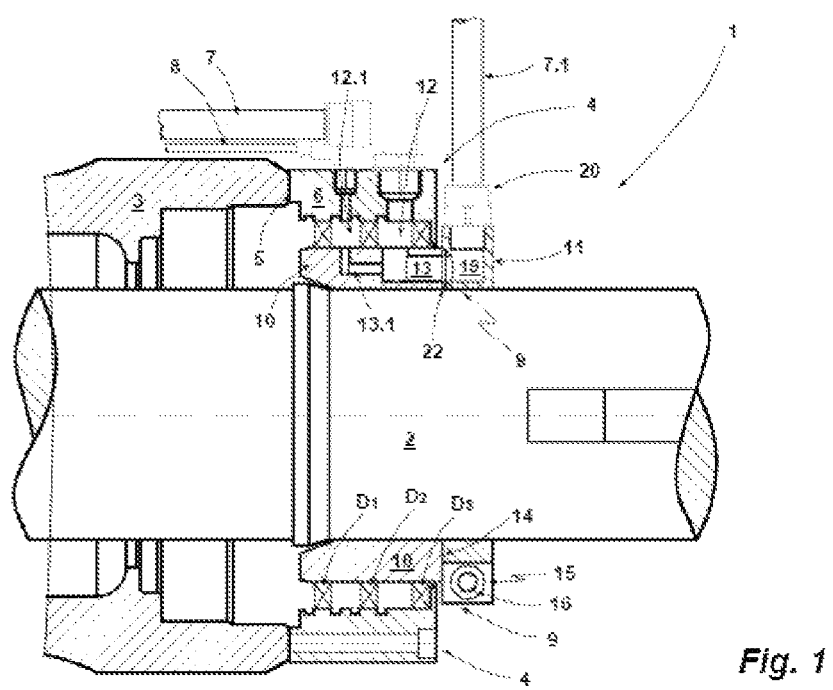
FIG. 1 shows a cross-sectional view of a rotary transmission leadthrough as part of a tire pressure regulating system for a motor vehicle.

A rotary transmission leadthrough 1 is part of a tire pressure regulating system for a motor vehicle. The rotary transmission leadthrough 1 shown in FIG. 1 is placed on a drive shaft 2 of the vehicle and connected in a torque-connected manner to this shaft. The drive shaft 2 is surrounded on one side by an axle box 3. The free section of the drive shaft 2 supports one or even more wheels, which are driven by the drive shaft 2.

In the depicted embodiment, the rotary transmission leadthrough comprises a stator structural group 4 that borders the outer closure 5 of the axle box 3. The stator structural group 4 comprises an annular body 6 with connections attached to it, to which the lines on the vehicle side are connected. A working line 7 connected to a supply of compressed air and a control line 8 are connected to the stator structural group 4. The rotary transmission leadthrough 1 includes a rotor structural group 9 in addition to the stator structural group 4. In the depicted embodiment, the rotor structural group 9 comprises two structural parts, namely, a first rotor part 10 and a second rotor part 11. The first rotor part 10 of the rotor structural group 9 is arranged concentrically to and rests radially inside the stator structural group 4. A movement slot is located between the stator structural group 4 and the first rotor part 10 of the rotor structural group 9. The movement slot is subdivided into two transmission conduits 12, 12.1 by three seals $D_1$, $D_2$, $D_3$ located in an axial arrangement to each other. The transmission conduit 12 is connected with the working line 7. The transmission conduit 12.1 is connected with the control line 8. Each conduit 12, 12.1 communicates with the working line 7 and/or the control line 8 via bores extending through the annular body 6. The first rotor part 10 also has a pair of conduits 13, 13.1 that communicate with transmission conduits 12 and 12.1. Conduits 13, 13.1 are designed as angled conduits. The other end of conduits 13, 13.1 exits the front surface 14 of the first rotor part 10. Front surface 14 faces in the axial direction.

The stator structural group 4 and the first rotor part 10 of the rotor structural group 9 are constructed like the exemplary embodiment disclosed in DE 20 2010 008 453 U1. The description disclosed therein applies equally to the elements and/or structural groups of the rotary transmission leadthrough 1 of the present disclosure.

The second rotor part 11 of the rotor structural group 9 is similar to a tensioning ring. A tensioning screw 15 serves as tensioning means and extends through the tensioning slot 22. The bottom of the head 16 of tensioning screw 15 rests on a stop face 17. The stop face 17 is part of a recess 18 made in the radial direction into the second rotor part 11. Conduits 19 are placed into the second rotor part 11 as angled bores. Conduits 19 are aligned with the mouths of the conduits 13, 13.1 of the first rotor part 10. Conduits 19 extend to the radial outside of the second rotor part 11. A connection screw coupling 20 is present at the end of conduits 19 at the radial outside of second rotor part 11. Wheel-side working line 7.1 is connected to connection screw coupling 20. Working line 7.1 has a fluid communication with the inside of the tire in a manner not shown in detail.

Figure 2:
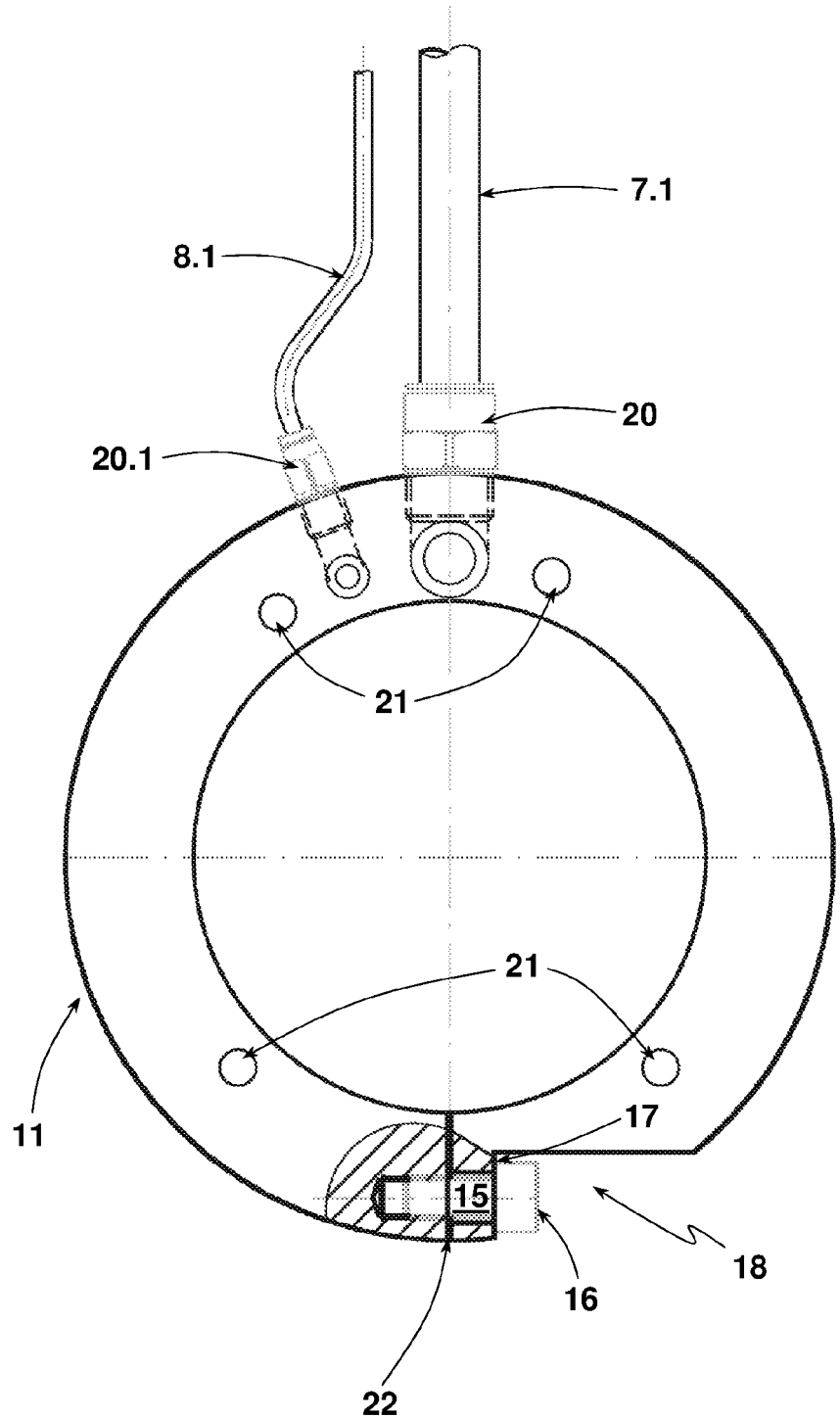
FIG. 2 shows a top view onto a part of the rotary transmission leadthrough of FIG. 1.

The top view onto the second rotor part 11 of FIG. 2 shows that another conduit is provided in addition to conduit 19. This conduit is for the control line 8.1 with a corresponding connection screw coupling 20.1. The connection screw coupling 20.1 and the wheel-side control line 8.1 connected to it are blocked in FIG. 1 by the connection screw coupling 20 and the working line 7.1 connected to it.

The second rotor part 11 is connected to the first rotor part 10 in a torque-connected manner by connection screws that are not shown in detail in the figures. These screws are inserted into the second rotor part 11 parallel to bores 21 extending through its longitudinal axis. The connection screws extend with their threaded end into complementary threaded sleeves on the first rotor part 10 and are fixed into the sleeves. The bores 21, are typically constructed in a stepped manner so that the head of the connection screw is received in the second rotor part 11. In addition, the alignment of the tensioning screw 15 connecting the second rotor part 11 on the drive shaft 2 in a torque-connected manner can be seen in FIG. 2 in a partial sectional view.

In the depicted embodiment, the diameter of the bores 21 is greater than is required for leading the screw shaft through by the required tensioning play. The rotary transmission leadthrough 1 is pushed onto the drive shaft 2 with the previously mounted rotor structural group 9 until it has reached its proper position, as is shown, for example, in FIG. 1. In this preliminary mounting the connection screws for connecting the second rotor part 11 to the first rotor part 10 are not yet tightened although they already enter into the threaded sleeves of the first rotor part 10. Due to the existing play in the diameter of the bore 21 the second rotor part 10 can now be secured in the drive shaft 2. The connection screws are subsequently tightened so that the second rotor part 11 is firmly connected to the first rotor part 10. Sealing rings—in the exemplary embodiment shown as O-rings—are inserted into the air transition sites between the conduits of the first rotor part 10 and the second rotor part 11 in order to seal these air transition sites. In FIG. 1, O-ring 22 seals the conduit 13 of the first rotor part 10 with the conduit 19 of the second rotor part 11. Thus, when the connection screws are tightened to attach the second rotor part 11 on the first rotor part 10, O-ring 22, and all the O-rings sealing the conduits of the control line of the two rotor parts 10, 11 are secured.

As a consequence of the previously described sealed connections between the conduits of the first rotor part 10 and those of the second rotor part 11, no further elements, in particular, no screw connections, are necessary for this sealed connection. Therefore, the rotary transmission leadthrough 1 can be designed with a shorter axial extent compared to previously known rotary transmission leadthroughs. In addition, it is clear that the radial connection, screw couplings 20, 20.1 and the lines 7.1, 8.1 connected thereto, are effectively protected by the second rotor part 11 from damage as a consequence of an improper manipulation of the wheel when mounting the wheel.

The exemplary embodiment described relates to a two-conduit rotary transmission leadthrough comprising a working conduit and a control conduit. It can also be utilized with one conduit or also with more than two conduits.

It is absolutely possible to divide one or more of the conduits, in particular, the working conduit in the area of the rotary transmission leadthrough into several individual conduits. Such division is particularly useful to leave the cross-sectional surface of the conduit that can be flowed through as large as possible.

The foregoing description makes it clear that the described rotary transmission leadthrough and the tire pressure regulating system comprising such rotary transmission leadthroughs are also suited for retrofitting.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. and all combinations and subcombinations possible of the group are intended to be individually included in the disclosure.

LIST OF REFERENCE NUMERALS 1 rotary transmission leadthrough
2 drive shaft
3 axle box
4 stator structural group
5 closure
6 annular body
7, 7.1 working line
8, 8.1 control line
9 rotor structural group
10 first rotor part
11 second rotor part
12, 12.1 transmission conduit
13, 13.1 conduit
14 front surface
15 tensioning screw
16 head
17 stop face
18 recess
19 conduit
20, 20.1 connection screw coupling
21 bore
O-ring
$D_1, D_2, D_3$ seal

The invention claimed is:

1. A rotary transmission leadthrough as part of a tire pressure regulating system of a vehicle comprising:
a rotor structural group;
said rotor structural group connected to a shaft in a torque-connected manner;
said shaft supporting a wheel;
a stator structural group;
said stator structural group stationarily arranged opposite a rotary movement of said rotor structural group;
whereby a sealed or sealable annular transmission conduit is present between said rotor structural group and said stator structural group;
said sealed or sealable annular transmission conduit is a path for transferring a gas between said stator structural group and said rotor structural group for the purpose of regulating the tire pressure;
wherein the rotor structural group is constructed in a multipartite manner;
wherein a first rotor part is designed as a closed annular body that can be pushed on said shaft;
wherein a second rotor part is arranged axially to the first rotor part and connected to it in a torque-connected manner;
wherein said second rotor part is designed as a tensioning ring for connecting the rotor structural group to the vehicle shaft in a torque-connected manner;
wherein the first rotor part comprises a first conduit having a first end and a second end;
wherein the first end is connected to the sealed or sealable annular transmission conduit;
wherein the second end is connected in the axial direction to a first end of a second conduit;
the second conduit is housed in the second rotor part;
wherein a second end of the second conduit attaches to a connection piece; and
the connection piece is associated with the second rotor part for connecting a line running to the wheel.

2. The rotary transmission leadthrough according to claim 1, wherein the connection piece of the second rotor part constitutes a radial outflow for a line to be connected to said connection piece opposite said second rotor part.

3. The rotary transmission leadthrough according to claim 1, wherein:
said sealed or sealable annular transmission conduit is arranged in a radial arrangement between said first rotor part of said rotor structural group and said stator structural group; and
said stator structural group is the external structural group of said rotary transmission leadthrough.

4. The rotary transmission leadthrough of claim 1, wherein an air transition site between said first conduit of said first rotor part is sealed against said second conduit of said second rotor part by interposing a sealing ring.

5. The rotary transmission leadthrough of claim 1, wherein:
said rotary transmission leadthrough is constructed in a multi-conduit manner,
whereby said rotary transmission leadthrough has a number of transmission conduits corresponding to the number of conduits; and
wherein said first rotor part and said second rotor part have at least one conduit associated with each transmission conduit.

6. The rotary transmission leadthrough of claim 5, wherein:
at least one conduit of the multi-conduit rotary transmission leadthrough is a working conduit; and
wherein at least one other conduit is a control conduit.

7. A rotary transmission leadthrough as part of a tire pressure regulating system of a vehicle comprising:
a rotor structural group;
the rotor structural group connected to a shaft in a torque-connected manner;
the shaft supporting a wheel;
a stator structural group;
the stator structural group stationarily arranged opposite a rotary movement of the rotor structural group;
whereby a sealed or sealable annular transmission conduit is present between the rotor structural group and the stator structural group;
the sealed or sealable annular transmission conduit is a path for transferring a gas between the stator structural group and the rotor structural group for the purpose of regulating the tire pressure;
wherein the rotor structural group is constructed in a multipartite manner;
wherein a first rotor part is designed as a closed annular body that can be pushed on the shaft;
wherein a second rotor part is arranged axially to the first rotor part and connected to it in a torque-connected manner;
wherein the second rotor part is designed as a tensioning ring for connecting the rotor structural group to the vehicle shaft in a torque-connected manner;
said second rotor part includes a recess introduced in a radial direction;
said second rotor part includes a tensioning slot;
wherein a tensioning screw extends through said tensioning slot;
said tensioning screw having a head and a tail;
said head of said screw in said recess; and
wherein said head of said screw is rests against a stop face of said recess.

8. A rotary transmission leadthrough as part of a tire pressure regulating system of a vehicle comprising:
a rotor structural group;
the rotor structural group connected to a shaft in a torque-connected manner;
the shaft supporting a wheel;
a stator structural group;
the stator structural group stationarily arranged opposite a rotary movement of the rotor structural group;
whereby a sealed or sealable annular transmission conduit is present between the rotor structural group and the stator structural group;
said sealed or sealable annular transmission conduit is a path for transferring a gas between the stator structural group and the rotor structural group for the purpose of regulating the tire pressure;
wherein the rotor structural group is constructed in a multipartite manner;
wherein a first rotor part is designed as a closed annular body that can be pushed on the shaft;
wherein a second rotor part is arranged axially to the first rotor part and connected to it in a torque-connected manner;
wherein the second rotor part is designed as a tensioning ring for connecting the rotor structural group to the vehicle shaft in a torque-connected manner;

said second rotor part is connected to said first rotor part by several connecting screws arranged with their longitudinal axis parallel to the axis of rotation of the rotor structural group; and wherein said connecting screws extend through said second rotor part and engage with their screw shaft into complementary threaded sleeves of said first rotor part.

9. The rotary transmission leadthrough according to claim 8, wherein:

said connecting screws extend through bores of the second rotor part;

wherein the diameter of said bores is greater than the diameter of said screws by at least the tensioning play required for fixing said second rotor part on said shaft.

* * * * *